E. L. ANDERSON.
STUD OR BUTTON.
APPLICATION FILED JAN. 11, 1909.

928,622.

Patented July 20, 1909.

WITNESSES:
Chas. H. Luther
Ada E. Hagerty

INVENTOR:
Edward L. Anderson
by Joseph H. Miller
ATTORNEY.

UNITED STATES PATENT OFFICE.

EDWARD L. ANDERSON, OF ATTLEBORO, MASSACHUSETTS.

STUD OR BUTTON.

No. 928,622.  Specification of Letters Patent.  Patented July 20, 1909.

Application filed January 11, 1909. Serial No. 471,680.

*To all whom it may concern:*

Be it known that I, EDWARD L. ANDERSON, a citizen of the United States, residing at Attleboro, in the county of Bristol and State of Massachusetts, have invented a new and useful Improvement in Studs or Buttons, of which the following is a specification.

This invention has reference to an improvement in studs or buttons and more particularly to an improvement in that form of a stud or button having an L-shaped hollow post in the arm of which is a cross pin slidably secured in the arm and adapted to form a T-shaped end on the post, when the pin is in the closed position.

The object of my invention is to improve the construction of a stud or button having an L-shaped hollow post, a pin slidably secured in the arm of the post and a whip spring in the post bearing on the pin, whereby the pin is held in the open or closed position under spring tension, the stud or button constructed without solder and the construction simplified, thereby reducing the cost of manufacturing the stud or button.

My invention consists in the peculiar and novel construction of a stud or button having a head, an L-shaped hollow post, a pin slidably secured in the arm of the post, a whip spring in the post bearing on the pin, and details of construction as will be more fully set forth hereinafter and claimed.

Figure 1:
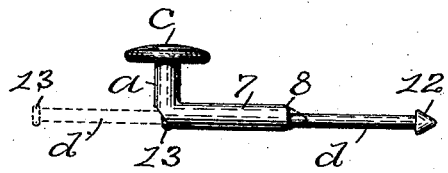
Figure 2:
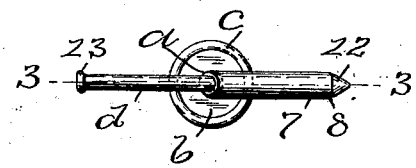
Figure 3:
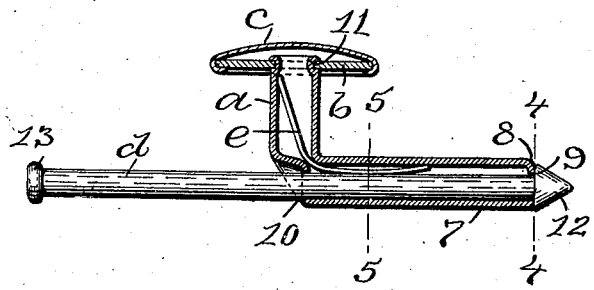
Figure 4:
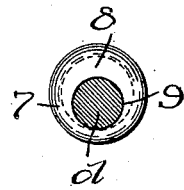
Figure 5:
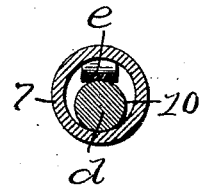

Figure 1 is a side view of my improved stud, showing the pin in the open position in full lines and in the closed position in broken lines. Fig. 2 is a back view of the stud with the pin in the closed position. Fig. 3 is an enlarged longitudinal sectional view taken on line 3 3 of Fig. 2, of the stud. Fig. 4 is a still further enlarged transverse sectional view taken on line 4 4 of Fig. 3 through the pin. Fig. 5 is an enlarged transverse sectional view similar to Fig. 4 taken on line 5 5 of Fig. 3 through the arm, pin and spring of the stud.

In the drawings, $a$ indicates the hollow L-shaped post, $b$ the head of the post, $c$ the cap forming the head of the stud, $d$ the pin, and $e$ the whip spring of my improved stud or button. The hollow-L-shaped post $a$ is constructed of a predetermined length of tubular wire bent at right angles to form the hollow arm 7 having the contracted end 8 in which is the off-center hole 9 for the pin $d$ and the oppositely-disposed off-center hole 10 in the bend of the post and in alinement with the hole 9 for the pin $d$, as shown in Fig. 3. The head $b$ is in the form of a circular disk having a central hole 11 for the post $a$ which is secured to the head by riveting the end of the post to the head through the hole in the head, as shown in Fig. 3. The cap $c$ is secured to the head $b$ by rolling the edge of the cap over the edge of the head, as shown in Fig. 3, and forms the head of the stud. The pin $d$ is in the form of a round wire having the pointed cone-shaped end 12 and the up-set end 13. The pin $d$ has a sliding fit through the holes 9 and 10 which are off-center toward the outer face of the arm 7, as shown in Figs. 3, 4 and 5. The whip spring $e$ is held in the post $a$ in a position for its free end to extend into the arm 7 and secured in position between the inner bend of the post and the metal forming the edge of the hole 10, by reason of the pressure of the metal forming the edge of the hole 10 upon it, as shown in Fig. 3.

The pin $d$ is inserted through the holes 9 and 10 in the arm 7 and the up-set end 13 formed on the same, thereby preventing the removal of the pin. The free end of the whip spring $e$ in the arm 7 now bears on the pin $d$, as shown in Fig. 3, with sufficient force or friction to hold the pin in either the closed or open position.

Having thus described my invention, I claim as new and desire to secure by Letters Patent;—

In a stud or button, the combination with a hollow post bent at right angles to form a hollow arm having off-center holes in its ends, a head secured to the post, of a round wire having a pointed cone-shaped end and an up-set end, and having a sliding fit through the off-center holes in the arm, and a whip spring held in the post in a position for the free end of the spring to extend into the arm and bear on the round wire.

In testimony whereof I have signed my name to this specification in the presence of two subscribing witnesses.

EDWARD L. ANDERSON.

Witnesses:
 ADA E. HAGERTY,
 J. A. MILLER.